(12) United States Patent
Urban et al.

(10) Patent No.: US 6,640,624 B2
(45) Date of Patent: Nov. 4, 2003

(54) METHOD AND APPARATUS FOR MONITORING WHEEL SPEEDS

(75) Inventors: Werner Urban, Vaihingen/enz (DE); Thomas Braun, Murr (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/035,068

(22) Filed: Dec. 26, 2001

(65) Prior Publication Data

US 2002/0108797 A1 Aug. 15, 2002

(30) Foreign Application Priority Data

Dec. 22, 2000 (DE) .......................... 100 64 504

(51) Int. Cl.[7] ................. G01M 17/02; B60C 23/00
(52) U.S. Cl. ................................. 73/146; 340/444
(58) Field of Search ................. 73/146, 146.2–146.8; 340/442–447; 702/145, 148

(56) References Cited

U.S. PATENT DOCUMENTS 5,373,447 A * 12/1994 Howes et al. ............ 701/91
6,044,320 A * 3/2000 Stuible et al. ............ 701/72
6,223,135 B1 * 4/2001 Muller .................... 702/148

* cited by examiner

Primary Examiner—William Oen
(74) Attorney, Agent, or Firm—Kenyon & Kenyon

(57) ABSTRACT

A method for monitoring wheel speeds, having the following steps: Determining the wheel speeds (S01), determining the wheel having the maximum wheel speed (S02), determining the wheel having the minimum wheel speed (S03), determining the speed difference between the maximum wheel speed and minimum wheel speed (S04), and comparing the speed difference to a threshold value (S05), deep snow or road conditions of comparable effect being inferred if the speed difference is greater than a threshold value and the slowest wheel has changed exactly once and the fastest wheel has changed exactly once or the slowest wheel has not changed and the fastest wheel has not changed and the speed difference between a driven axle and a non-driven axle exceeds a threshold value.

15 Claims, 1 Drawing Sheet

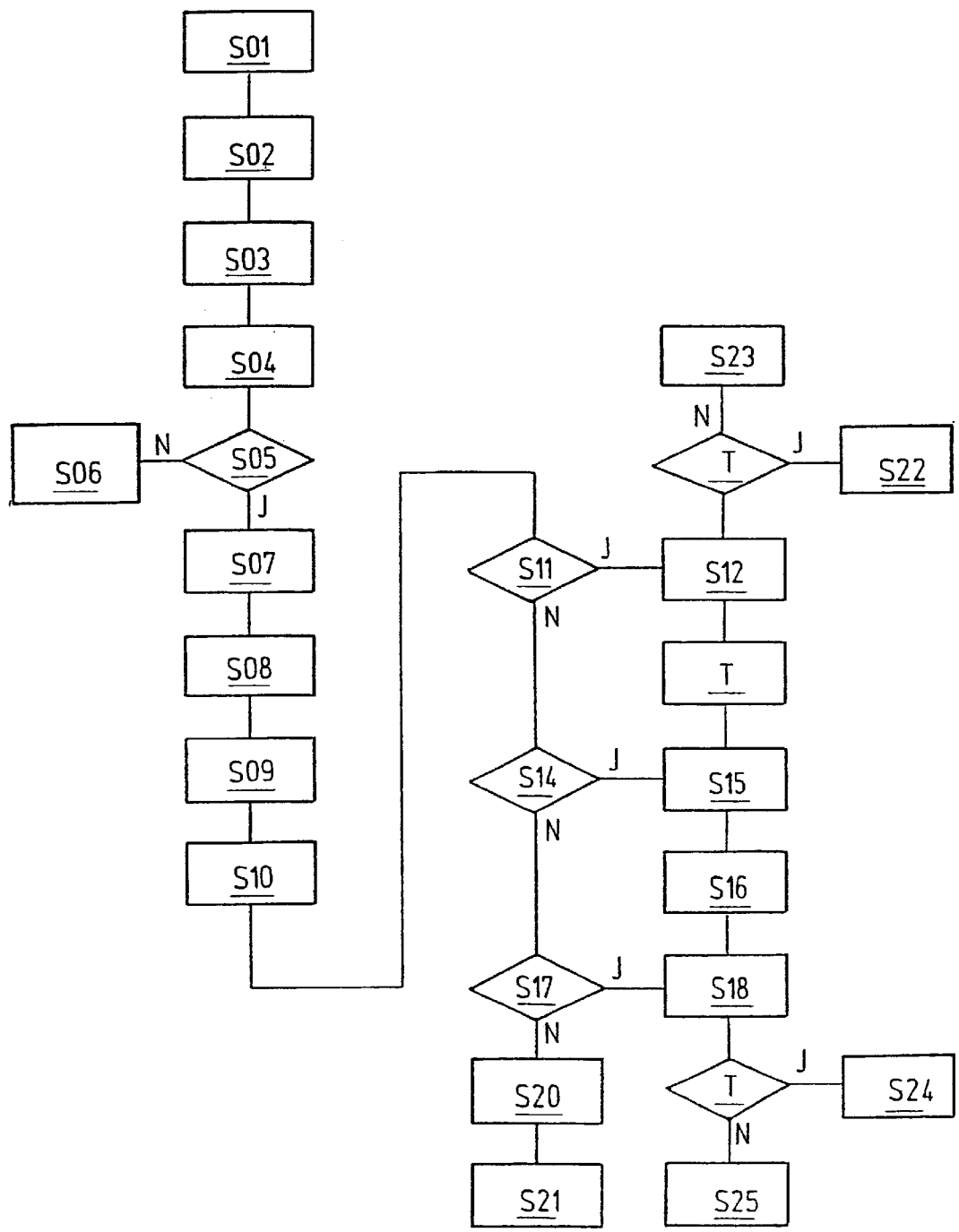

METHOD AND APPARATUS FOR MONITORING WHEEL SPEEDS

FIELD OF THE INVENTION

The present invention relates to a method for monitoring wheel speeds, having the following steps: Determining the wheel speeds, determining the wheel having the maximum wheel speed, determining the wheel having the minimum wheel speed, determining the speed difference between the maximum wheel speed and minimum wheel speed, and comparing the speed difference to a threshold value. The present invention further relates to an apparatus for monitoring wheel speeds, having means for determining the wheel speeds, means for determining the wheel having the maximum wheel speed, means for determining the wheel having the minimum wheel speed, means for determining the speed difference between the maximum wheel speed and the minimum wheel speed, and means for comparing the speed difference to a threshold value.

BACKGROUND INFORMATION

In vehicle safety systems, for example in the electronic stability program (ESP), the rotation speed sensor signals are elementary input variables. From the rotation speed sensor signals and with the aid of additional sensor signals, the free-rolling wheel speeds referred to the center of the rear axle are calculated. Using the additional sensor signals it is possible to refer the wheel speeds to the vehicle center of gravity or to the center of the rear axle. These wheel speeds referred to the vehicle center of gravity or the center of the rear axle need to be exactly monitored for numerous functions, for example for the ABS (antilock braking system) function or ASR (automatic slip control) function. It is necessary to monitor the wheel speeds very accurately in particular for the ASR portion of the ESP, since narrow activation thresholds are used for these functions.

In any event, it is advantageous to detect erroneous signals that may occur, because of incorrect or defective gears or also as a result of failed rotation speed sensors or an excessive gap dimension.

According to the existing art, monitoring of the wheel slip is accomplished on the basis of a logic system which is active above the vehicle reference speed of 18 km/h. At 20 km/h, the difference between the slowest and fastest wheel speeds must be no greater than 2 km/h. This value corresponds to 10%. At 100 km/h, the difference must be no greater than 5 km/h. This value corresponds to 5%. Between 18 km/h and 100 km/h, the permissible differences are correspondingly linearly extrapolated or interpolated. Above 100 km/h, the slip difference between one wheel and the other three wheels must not be greater than 5% in each case. If the difference is greater than indicated by the above limit values, a fault counter is incremented. After a specific time period, for example 20 seconds, a fault is identified as present.

In the existing logic system, it is problematic that the monitoring is performed solely on the basis of the slowest and fastest wheel speeds. At vehicle speeds below 100 km/h in particular, robustness problems can therefore occur on irregular roads or, for example, in deep snow. The existing logic system does not contain a so-called deep snow detector.

SUMMARY OF THE INVENTION

The present invention expands upon the method of the species in that deep snow or road conditions of comparable effect are inferred if the speed difference is greater than a threshold value and/or the slowest wheel has changed exactly once and the fastest wheel has changed exactly once or the slowest wheel has not changed and the fastest wheel has not changed and the speed difference between a driven axle and a non-driven axle exceeds a threshold value. The axle speeds can be calculated, for example, as the average of the wheel speeds of the wheels arranged on an axle. The threshold value can be selected, for example, in such a way that if the driven axle exhibits a speed that is 4 km/h greater than that of the non-driven axle, deep snow is identified as present.

Preferably, deep snow or road conditions of comparable effect on one side are inferred if the difference between the averaged wheel speeds of the vehicle sides exceeds a threshold value. This threshold value can be set, for example, at 2 km/h.

It is also advantageous if deep snow or road conditions of comparable effect on both sides are inferred if a tire tolerance compensation has been performed. It is thus possible to identify as present both deep snow on one side and deep snow on both sides, and consequently to decrement a fault counter of the slip monitoring system for the rotation speed sensor signals. Greater robustness of the control system is thereby obtained, this advantageously being seen in particular in the context of deep snow, aquaplaning, mud, sand, or similar road conditions.

The present invention is advantageous in particular because deep snow or road conditions of comparable effect are inferred on the basis of a wheel logic in which, if the speed difference is greater than a threshold value, the wheel having the maximum wheel speed is recorded as the fastest wheel and the wheel having the minimum wheel speed is recorded as the slowest wheel; in the event of a change in wheel speed, so that a different wheel is the fastest wheel and/or a different wheel is the slowest wheel, the fastest wheel is recorded and the slowest wheel is recorded; and from the recorded values and the present values, a logical status is ascertained. This wheel logic increases the robustness of the control system, since the monitoring is not taking place solely on the criterion of the slowest and fastest wheel speeds. Instead, the system records whether a change in the slowest or fastest wheel takes place. On the basis of the various cases that can occur, a corresponding status can be ascertained for the logical combinations that occur. On the basis of such a status, a probable number of faulty wheels can be inferred. In addition, a fault counter can be incremented or decremented depending on whether a fault, and which fault, is present. In particular, the fault counter can be decremented if deep snow on one side or both sides was identified as present.

Preferably, status 0 is identified as present if the slowest wheel and/or the fastest wheel have changed more than once. If the slowest wheel and/or fastest wheel changes more than once during monitoring, an implausibility is then present, such as can occur on a particular stretch of road with an uneven ("washboard") surface. In a situation that corresponds to status 0, however, it is not possible to infer an actual fault.

Advantageously, status 1 is identified as present if only the slowest wheel has not changed or if only the fastest wheel has not changed. If the slowest or the fastest wheel was therefore hitherto always the same wheel, this indicates a single faulty wheel.

It is preferred if status 2 is identified as present if the slowest wheel has changed exactly once and the fastest wheel has changed exactly once. In status 2, two faulty wheels are therefore probably present. The test for a difference in axle speeds is performed when status 2 exists, however, and a check is also made as to whether different average speeds are present on the two sides of the vehicle or whether a tire tolerance compensation has been performed. If a specific minimum difference exists between the axle speeds, as well as a difference between the speeds of the wheels on the two sides of the vehicle, deep snow on one side is inferred. If a tire tolerance compensation was performed, deep snow on both sides is inferred.

It is further preferred if status 3 is identified as present if the slowest wheel has not changed and if the fastest wheel has not changed. In such a situation, one or two faulty wheels are inferred. In this case as well, a check is made for the presence of deep snow. Deep snow on one side is present if, in addition to the identification of status 3 as present, the difference between the axle speeds exceeds a threshold value, and the difference between the averaged wheel speeds on the sides of the vehicle exceeds a threshold that is also predetermined.

It is advantageous if when status 0 exists, a fault counter is decremented. Since a fault cannot be inferred in status 0—it would be happenstance if a fault were present simultaneously with the identification of status 0 as present—a fault counter is decremented. If the fault counter is reset to 0 as a result of this decrementing of the fault counter, the recorded wheels are then deleted. The wheel logic is thus reinitialized.

Preferably, when status 1 and status 3 exist a fault counter is incremented by 2. After a specific time period, for example 20 seconds, a fault can thus be identified as present. The fault counter is decremented, however, if deep snow was identified as present while status 3 was present.

It is preferred to increment a fault counter by 1 when status 2 exists. In status 2, a fault can therefore be identified as present after, for example, 40 seconds. The fault counter is decremented, however, if deep snow was identified as present when status 2 existed.

It is useful that the wheel speeds are determined from rotation speed sensor signals and additional sensor signals. With the combination of these signals, it is possible to determine wheel speeds referred to the vehicle center of gravity or to the center of the rear axle, which are particularly well suited for slip monitoring.

The method according to the present invention is advantageous in particular because of the fact that the speed difference is compared to a relative threshold. For example, the relative threshold can be 5% over the entire speed range between 20 km/h and 100 km/h.

Another possibility, however, is that below a speed threshold, the speed difference is compared to an absolute threshold value. The speed threshold below which a constant value is used can lie, for example, at 40 km/h, a speed difference threshold of, for example, 2 km/h between the slowest and fastest wheel being the criterion for initiating monitoring with the wheel logic according to the present invention.

The present invention expands upon the apparatus of the species in that deep snow or road conditions of comparable effect are inferred if the speed difference is greater than a threshold value and the slowest wheel has changed exactly once and/or the fastest wheel has changed exactly once or the slowest wheel has not changed and the fastest wheel has not changed and the speed difference between a driven axle and a non-driven axle exceeds a threshold value. The axle speeds can be calculated, for example, as the average of the speeds of the wheels arranged on an axle. The threshold value can be selected, for example, in such a way that if the driven axle has a speed that is 4 km/h greater than that of the non-driven axle, deep snow is identified as present.

The present invention is based on the recognition that a monitoring function with improved robustness can be made available by introducing a wheel logic system. This applies in particular to monitoring of the slip control system on unusual ("washboard") road surfaces, or in the context of other special road conditions such as deep snow.

BRIEF DESCRIPTION OF THE DRAWING

The FIGURE shows a flow chart to explain the present invention.

DETAILED DESCRIPTION

The FIGURE shows a flow chart to explain the present invention. The meanings of the symbols labeling the method steps are as follows:

S01: Determine wheel speeds.
S02: Determine wheel having maximum wheel speed.
S03: Determine wheel having minimum wheel speed.
S04: Determine speed difference between maximum wheel speed and minimum wheel speed.
S05: Speed difference greater than threshold value?
S06: Wheel logic not activated.
S07: Record wheel having maximum wheel speed.
S08: Record wheel having minimum wheel speed.
S09: If wheel having maximum wheel speed has changed: Record wheel having maximum wheel speed.
S10: If wheel having minimum wheel speed has changed: Record wheel having minimum wheel speed.
S11: Wheel having maximum wheel speed AND wheel having minimum wheel speed hitherto always the same?
S12: Identify status 3 as present.
S14: Wheel having maximum wheel speed OR wheel having minimum wheel speed hitherto always the same?
S15: Identify status 1 as present.
S16: Increment fault counter by 2.
S17: One-time change in wheel having minimum wheel speed AND one-time change in wheel having maximum wheel speed?
S18: Identify status 2 as present.
S20: Identify status 0 as present.
S21: Decrement fault counter.
T: Deep snow detector.
S22: Decrement fault counter.
S23: Increment fault counter.
S24: Decrement fault counter.
S25: Increment fault counter.

In step S01, the wheel speeds of the wheels of a vehicle are determined. These speeds can be ascertained from the rotation speed sensor signals with the aid of additional sensor signals, so that ultimately wheel speeds referred to the vehicle center of gravity are determined.

In step S02, the wheel having the maximum wheel speed is determined. In step S03, the wheel having the minimum wheel speed is determined. The sequence of steps S02 and S03 is arbitrary.

In step S04, the speed difference between the maximum wheel speed and minimum wheel speed is then determined.

Step S05 checks whether the speed difference determined in step S04 is greater than a predetermined threshold value. For example, in a speed range between 20 km/h and 100 km/h, monitoring can be performed as to whether a relative speed difference is exceeded, for example whether the speeds of the wheel having the maximum wheel speed and of the wheel having the minimum wheel speed differ from one another by more than 5% as referred to the maximum wheel speed. Below a speed threshold that can be set, for example below 40 km/h, provision can be made to monitor for an absolute speed difference between the slowest and the fastest wheel, for example with a threshold value of 2 km/h.

If the threshold has not been exceeded, the wheel logic is not activated (step S06).

If the speed difference is greater than the threshold value, however, then in step S07 the wheel having the maximum wheel speed is recorded. In step S08, the wheel having the minimum wheel speed is recorded. Once again, the sequence of steps S07 and S08 is immaterial.

If the wheel having the maximum wheel speed then changes—i.e., if a different wheel now has the maximum wheel speed—then in step S09 that wheel is recorded. The same applies to a change in the wheel having the minimum wheel speed; in other words, if a different wheel now has the minimum wheel speed, that wheel is recorded in step S10. The sequence of steps S09 and S10 is arbitrary.

In step S11, a check is made in the context of the wheel logic according to the present invention as to whether the wheel having the maximum wheel speed and the wheel having the minimum wheel speed were hitherto always the same. If this question is answered Yes, i.e. if no change has taken place in the wheel having the minimum wheel speed and the wheel having the maximum wheel speed, then in step S12 logical status 3 is identified as present. In module T, detection of deep snow on one side is performed. If the lowpass-filtered differences between the averaged axle speeds are greater than a threshold value, and if moreover the lowpass-filtered differences between the averaged wheel speeds of the sides of the vehicle are greater than a further predetermined threshold value, deep snow on one side is then identified as present. The fault counter is decremented in step S22. If, however, deep snow is not identified as present, the fault counter is incremented by 2 in step S23.

If the question in step S11 is answered No, step S14 then checks whether the wheel having the maximum wheel speed or the wheel having the minimum wheel speed was hitherto always the same. If this question is answered Yes, i.e. if only and exactly one of the wheels having the maximum wheel speed or minimum wheel speed has not changed, then in step S15 status 1 is identified as present. In step S16, in turn, the fault counter is incremented by 2.

If the question in step S14 is answered No, step S17 then checks whether a one-time change in the wheel having the slowest wheel speed has taken place, and also whether a one-time change in the wheel having the maximum wheel speed has taken place. If this question is answered Yes, then in step S18 status 2 is identified as present. In module T, a detection of deep snow on one side or both sides is performed. If the lowpass-filtered differences between the averaged axle speeds are greater than a threshold value, and if moreover the lowpass-filtered differences between the averaged wheel speeds of the vehicle sides are greater than a further predetermined threshold value, deep snow on one side is identified as present. In step S24, the fault counter is decremented. If, when a tire tolerance compensation has been performed, the lowpass-filtered difference between the averaged axle speeds is greater than a predetermined threshold value, in a context in which the driven axle is turning faster than the non-driven axle, then deep snow on both sides is identified as present. If, however, deep snow is not identified as present, then in step S25 the fault counter is incremented by 2.

If the question in step S17 is answered No, then in step S20 status 0 is identified as present. This status 0 represents an implausibility such as can occur on an unusual ("washboard") road surface. A fault cannot be inferred when status 0 is present. In step S21 the fault counter is decremented.

If status 1 has been identified as present, then a single faulty wheel is probably present. If deep snow was not identified as present, then if status 2 exists, two faulty wheels probably are present, and if status 3 exists then one or two faulty wheels can be inferred. After a specific time period, for example 20 seconds for status 1 and 3 and 40 seconds for status 2, a fault is identified as present. If, however, status 0 has been identified as present and the fault counter was therefore decremented, the stored wheel indices are then deleted when the fault counter again reads 0. The wheel logic system is reinitialized.

The foregoing description of the exemplary embodiments according to the present invention is intended only for illustrative purposes and not to limit the present invention. A variety of changes and modifications are possible within the context of the present invention without leaving the compass of the present invention and its equivalents.

What is claimed is:

1. A method for monitoring wheel speeds of a plurality of wheels, comprising the steps of:
   determining the wheel speeds;
   determining which of the plurality of wheels has a maximum wheel speed of the wheel speeds;
   determining which of the plurality of wheels has a minimum wheel speed of the wheel speeds;
   determining a first speed difference between the maximum wheel speed and the minimum wheel speed;
   comparing the first speed difference to a first threshold value;
   determining a second speed difference between a speed of a driven axle and a speed of a non-driven axle; and
   comparing the second speed difference to a second threshold value, wherein one of deep snow and a road condition of comparable effect are inferred if one of the following is true:
   a first state is present in which:
      the first speed difference is greater than the first threshold value, and
      a slowest of the plurality of wheels has changed exactly once and a fastest of the plurality of wheels has changed exactly once, and
   a second state is present in which:
      the slowest of the plurality of wheels has not changed and the fastest of the plurality of wheels has not changed, and
      the second speed difference is greater than the second threshold value.

2. The method according to claim 1, wherein:
   one of deep snow and the road condition of comparable effect on one side are inferred if a difference between averaged wheel speeds of vehicle sides exceeds a third threshold value.

3. The method according to claim 1, wherein:
   one of deep snow and the road condition of comparable effect on both sides are inferred if a tire tolerance compensation has been performed.

4. The method according to claim 1, wherein:
   one of deep snow and the road condition of comparable effect are inferred on the basis of a wheel logic in which, if the first speed difference is greater than the first threshold value:

the wheel having the maximum wheel speed is recorded as the fastest wheel and the wheel having the minimum wheel speed is recorded as the slowest wheel, in the event of a change in wheel speeds, so that at least one of a different wheel is the fastest wheel and a different wheel is the slowest wheel, the fastest wheel is recorded and the slowest wheel is recorded, and from the recorded values and present values, a logical status is ascertained.

5. The method according to claim 1, wherein:

status 0 is identified as present if at least one of the slowest wheel and the fastest wheel have changed more than once.

6. The method according to claim 1, wherein:

status 1 is identified as present if one of only the slowest wheel has not changed and if only the fastest wheel has not changed.

7. The method according to claim 1, wherein:

status 2 is identified as present if the slowest wheel has changed exactly once and the fastest wheel has changed exactly once.

8. The method according to claim 6, wherein:

status 3 is identified as present if the slowest wheel has not changed and if the fastest wheel has not changed.

9. The method according to claim 5, wherein:

when status 0 exists, a fault counter is decremented.

10. The method according to claim 8, wherein:

when status 1 and status 3 exist, a fault counter is incremented by 2.

11. The method according to claim 7, wherein:

when status 2 exists, a fault counter is incremented by 1.

12. The method according to claim 1, wherein:

the wheel speeds are determined from rotation speed sensor signals and additional sensor signals.

13. The method according to claim 1, wherein:

the first threshold value includes a relative threshold.

14. The method according to claim 1, wherein:

below a speed threshold, the speed difference is compared to an absolute threshold value serving as the first threshold value.

15. An apparatus for monitoring wheel speeds of a plurality of wheels, comprising:

an arrangement for determining the wheel speeds;

an arrangement for determining which of the plurality of wheels has a maximum wheel speed of the wheel speeds;

an arrangement for determining which of the plurality of wheels has a minimum wheel speed of the wheel speeds;

an arrangement for determining a first speed difference between the maximum wheel speed and the minimum wheel speed;

an arrangement for comparing the first speed difference to a first threshold value;

an arrangement for determining a second speed difference between a speed of a driven axle and a speed of a non-driven axle; and an arrangement for comparing the second speed difference to a second threshold value, wherein one of deep snow and a road condition of comparable effect are inferred if one of the following is true:

a first state is present in which:
the first speed difference is greater than the first threshold value, and
a slowest of the plurality of wheels has changed exactly once and a fastest of the plurality of wheels has changed exactly once, and a second state is present in which:
the slowest of the plurality of wheels has not changed and the fastest of the plurality of wheels has not changed, and
the second speed difference is greater than the second threshold value.

* * * * *